US012723177B2

(12) United States Patent
Chen et al.

(10) Patent No.: US 12,723,177 B2
(45) Date of Patent: Sep. 1, 2026

(54) WATER-BASED HOT MELT ADHESIVE AND NONWOVEN COATED WITH THE WATER-BASED HOT MELT ADHESIVE

(71) Applicant: BenQ Materials Corporation, Taoyuan City (TW)

(72) Inventors: Ching-Huang Chen, Taoyuan City (TW); Kuo-Hsuan Yu, Taoyuan City (TW); Yen-Ling Lin, Taoyuan City (TW)

(73) Assignee: BenQ Materials Corporation, Taoyuan City (TW)

( * ) Notice: Subject to any disclaimer, the term of this patent is extended or adjusted under 35 U.S.C. 154(b) by 192 days.

(21) Appl. No.: 18/818,637

(22) Filed: Aug. 29, 2024

(65) Prior Publication Data

US 2025/0154383 A1 May 15, 2025

(30) Foreign Application Priority Data

Nov. 9, 2023 (TW) ................................ 112143273

(51) Int. Cl.
*C09J 7/35* (2018.01)
*C09J 123/06* (2006.01)

(52) U.S. Cl.
CPC ............... *C09J 7/35* (2018.01); *C09J 123/06* (2013.01); *C09J 2301/304* (2020.08); *C09J 2301/408* (2020.08); *C09J 2400/263* (2013.01)

(58) Field of Classification Search
CPC ...... C09J 7/35; C09J 123/06; C09J 2301/304; C09J 2301/408; C09J 2400/263; C09J 123/04; C08L 2201/54
See application file for complete search history.

(56) References Cited

U.S. PATENT DOCUMENTS 3,859,385 A 1/1975 Mainord
9,334,431 B2 * 5/2016 Hamann ................ C09J 157/02
2006/0105126 A1 5/2006 Kendig
2024/0360628 A1 10/2024 Wakabayashi et al.
2025/0154383 A1 5/2025 Chen et al.

FOREIGN PATENT DOCUMENTS

CN 1918257 A 2/2007
CN 103214983 A 7/2013
CN 108251016 A 7/2018
CN 108441149 A 8/2018
CN 108587521 A 9/2018
CN 108774481 A 11/2018
CN 110591602 A 12/2019
CN 112639041 A 4/2021
CN 114045144 A 2/2022
CN 115637122 A 1/2023
CN 116333656 A 6/2023
CN 116410678 A 7/2023
CN 116875239 A 10/2023
WO 2007008558 A2 1/2007

* cited by examiner

*Primary Examiner* — Elizabeth M Imani
(74) *Attorney, Agent, or Firm* — CKC & Partners Co., LLC

(57) ABSTRACT

The present disclosure is to provide a water-based hot melt adhesive for healthcare packaging. The water-based hot melt adhesive includes 100 weight parts of water-based polyolefin resin; 40 to 85 weight parts of wax particles; and 25 to 85 parts by weight of tackifier particles; wherein a total weight of the wax particles and the tackifier particles is from 45 wt % to 60 wt % of a total weight of the water-based hot melt adhesive. The coating layer coated by the water-based hot melt adhesive of the present disclosure on the healthcare packaging substrate has great gas-permeability, and satisfied seal strength and peelability after sealing with the periphery part of a flexible sheet or a blister container.

16 Claims, No Drawings

WATER-BASED HOT MELT ADHESIVE AND NONWOVEN COATED WITH THE WATER-BASED HOT MELT ADHESIVE

CROSS-REFERENCE TO RELATED APPLICATION

This application claims priority to Taiwan Application Serial Number 112143273 filed Nov. 9, 2023, the disclosures of which are incorporated herein by reference in their entireties.

BACKGROUND

Field of Invention

This invention relates to a water-based hot melt adhesive for forming a hot-melt adhesive coating layer on healthcare device packaging for heat sealing. The present hot-melt adhesive coating layer provides sufficient seal strength without affecting the gas-permeability required by the healthcare device packaging.

Description of Related Art

Healthcare device packaging is used to provide a microbial barrier to keep the healthcare device in a sterilized environment after sterilization and before use. The healthcare devices are commonly sterilized after packaging, the sterilization are steam sterilization, ethylene oxide (EO) sterilization or radiation sterilization. Different sterilization requires different packaging materials. For example, the packaging material for EO sterilization and steam sterilization has to provide gas-permeability to assure the steam and EO gas passing through the packaging material to reach the healthcare devices for sterilization. In the existing art, the common materials which provide good microbial barrier effect and gas-permeability are medical paper or breathable polyethylene non-woven fabrics made by melt-blown method, such as DuPont Tyvek®.

The healthcare device packaging material is processed by heat sealing, that is, to heat seal a breathable material, such as a medical paper or gas-permeable polyethylene film, with a plastic film or a plastic packaging tray at the peripheral edge thereof. In addition to gas-permeability, the medical packaging material is required to have sufficient heat seal strength and peelability. The insufficient heat seal strength of the material will cause the poor sealing of healthcare device packaging, which may result in the packaging broken due to high gas pressure in the sterilization. Also, excessive heat seal strength may make the packaging difficult to be peeled open or result in the occurrence of fiber tear to contaminate the healthcare devices when peeling open the packaging.

The medical gas-permeable materials, such as medical paper or breathable polyethylene films, are usually coated with heat-sealing adhesives layer to facilitate heat-seal packaging with various flexible sheets or plastic packaging trays.

The heat-sealing adhesives used in medical gas-permeable material is hot-melt adhesive. The conventional hot-melt adhesive is prepared by melting and blending thermoplastic resins, tackifiers, waxes, fillers, plasticizers, antioxidants and additives, and casting into the form of granule, strip, sheet or film for use and further, is applied by heat pressing or hot melting.

For example, CN108587521A describes an aqueous heat-seal adhesive for medical dialyzing paper, which is prepared by blending and emulsifying thermoplastic resin, resin tackifiers, waxes, emulsifiers and additives at 120° C. to prepare a hot-melt adhesive coating liquid and the coating liquid is coated on medical paper or non-woven fabric to form a heat-seal layer for providing high seal strength. However, the adhesive is prepared under high temperature and the adhesive strength provided by the heat-seal layer of the healthcare packaging is too high, it may result in fiber tear when peeling open the packaging, which may contaminate the healthcare device. CN110591602A describes a paper lid for a medical packaging tray coated with a surface adhesive layer and a primer layer with different compositions, wherein the adhesion from the surface adhesive layer and the primer layer is less than the adhesion from the surface adhesive layer and the packaging tray to make the paper lid and packaging tray to be easily peeled apart without damaging the paper lid. However, the two coating layers on the paper lid increases the manufacture inconvenience. Furthermore, CN108441149A describes a two-step process for preparing a hot-melt adhesive used as a heat seal layer on the medical packaging material. The preparation process comprises of mixing and blending thermoplastic resin, resin tackifiers and waxes at a temperature higher than 160° C. to form hot-melt powders, and then the powders emulsified and dispersed in polyacrylic acid emulsion to prepare a coating liquid. The two-step preparation process increases the manufacture complication.

The present invention is to provide a water-based hot-melt adhesive for forming a coating layer on healthcare packaging materials to provide the healthcare packaging materials sufficient gas-permeability, reliable seal strength and peelability after being heat sealed with a flexible sheet material or a blister container at the peripheral edges thereof.

SUMMARY

The present invention is to provide a water-based hot-melt adhesive for healthcare packaging, which can form a coating layer on a medical polyolefin spunbonded nonwoven fabric for heat sealing with flexible sheets or blister containers at the peripheral edges thereof while maintaining the coated nonwoven fabric with sufficient gas-permeability for steam sterilization or ethylene oxide (EO) sterilization and seal stability and providing sufficient reliable seal strength and peelability. When peeling open the heat sealing area to open the healthcare packaging, the water-based hot-melt adhesive layer is cleanly split to reduce the fiber tear occurred at the non-woven fabric which may cause contamination. Furthermore, the water-based hot-melt adhesive of the present invention can be prepared without blending step as required for preparing the conventional hot-melt adhesive, but provide sufficient seal strength and gas-permeability for the healthcare packaging after application.

The disclosed water-based hot-melt adhesive includes 100 weight parts of water-base polyolefin resin, 40 weight parts to 85 weight parts of wax particles, and 25 weight parts to 85 weight parts of tackifier particles, wherein a total amount of the wax particles and the tackifier particles is from 45 wt % to 60 wt % of a total weight of the water-based hot-melt adhesive.

The disclosed water-based hot-melt adhesive preferably includes 100 weight parts of water-base polyolefin resin, 45 weight parts to 80 weight parts of wax particles, and 30 weight parts to 80 weight parts of tackifier particles, wherein the total amount of the wax particles and the tackifier particles is from 48 wt % to 57 wt % of the total weight of the water-based hot-melt adhesive.

In the disclosed water-based hot-melt adhesive, a weight ratio of the wax particles and the tackifier particles is from 0.6:1 to 3:1.

A glass transition temperature (Tg) of the water-base polyolefin resin of the disclosed water-based hot-melt adhesive is less than 0° C. and a melting point thereof is more than 90° C., a glass transition temperature (Tg) of the wax particles is less than 0° C. and a melting point thereof is from 70° C. to 180° C., a glass transition temperature (Tg) of the disclosed tackifier particle is more than 0° C. and a melting point thereof is from 90° C. to 160° C.

A glass transition temperature (Tg) of the disclosed water-based hot-melt adhesive is from −120° C. to −50° C.

In the disclosed water-based hot-melt adhesive, a particle size (D50) of each of the wax particles can be in the range of from 3 μm to 20 μm and preferably in the range of from 3 μm to 15 μm.

In the disclosed water-based hot-melt adhesive, the glass transition temperature (Tg) of the wax particles is less than 0° C. and the melting point thereof is from 70° C. to 180° C. In the disclosed water-based hot-melt adhesive, the wax particles can be, for example, Fischer-Tropsch synthetic wax particles, polypropylene wax particles, polyethylene wax particles, oxidized polyethylene wax particles, microcrystalline wax or combination thereof.

In the disclosed water-based hot-melt adhesive, the tackifier particles (D50) can be in the range of from 3 μm to 35 μm and preferably in the range of from 5 μm to 30 μm.

In the disclosed water-based hot-melt adhesive, the tackifier particles can be, for example, C5 petroleum resin micropowders, C9 petroleum resin micropowders, C5/C9 copolymerized petroleum resin micropowders, hydrogenated C9 petroleum resin micropowders or combinations thereof.

In the disclosed water-based hot-melt adhesive, the water-base polyolefin resin can be, for example, water-based polyethylene resin, water-based polypropylene resin, water-based polybutylene resin, water-based oxidized polyethylene resin or combinations thereof.

In another embodiment of the disclosed water-based hot-melt adhesive, the water-based hot-melt adhesive can further include a water-based emulsion tackifier. In still another embodiment of the disclosed water-based hot-melt adhesive, the water-based hot-melt adhesive can include 10 weight parts to 60 weight parts of water-based emulsion tackifier per hundred weight parts of the water-base polyolefin resin and can use one or one more emulsion tackifiers.

In the disclosed water-based hot-melt adhesive, the water-based emulsion tackifier can be, for example, petroleum resin emulsion, rosin ester emulsion and the derivatives thereof, terpene resin and the modified resin derivatives thereof, thermoplastic phenol-formaldehyde resin emulsion, low-molecular polystyrene emulsion, vinyl acrylate copolymer emulsion or combinations thereof.

In another aspect, the present invention is to provide a water-based hot-melt adhesive coated nonwoven fabric including a polyolefin spunbonded nonwoven fabric substrate and a water-based hot-melt adhesive coating formed on at least one side of the polyolefin spunbonded nonwoven fabric. A gas-permeability of water-based hot-melt adhesive coated nonwoven fabric is less than 180 seconds and a seal strength thereof is more than 220 g/15 mm.

In the disclosed water-based hot-melt adhesive coated nonwoven fabric, a coating amount of the water-based hot-melt adhesive on the polyolefin spunbonded nonwoven fabric substrate is from 10 g/m$^2$ to 20 g/m$^2$.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The disclosed water-based hot-melt adhesive comprises 100 weight parts of water-base polyolefin resin, from 40 weight parts to 85 weight parts of wax particles, and from 25 weight parts to 85 weight parts of tackifier particles, wherein the total amount of the wax particles and the tackifier particles is from 45 wt % to 60 wt % of the total weight of the water-based hot-melt adhesive.

The disclosed water-based hot-melt adhesive can be coated on the surface of the polyolefin spunbonded nonwoven fabric after adding water as solvent and being dried at elevated temperature to obtain a water-based hot-melt adhesive coated nonwoven fabric. The water-based hot-melt adhesive coated nonwoven fabric can provide sufficient gas-permeability after heat sealing with a flexible sheet or a blister container at the peripheral edges to maintain sufficient gas-permeability for steam sterilization or ethylene oxide (EO) sterilization. Furthermore, the disclosed water-based hot-melt adhesive provide reliable heat sealing and peelability to meet the heat seal strength required by the healthcare packaging, when peeling open the healthcare packaging, the packaging will be opened at the seal area by cleanly splitting the water-based hot-melt adhesive layer to maintain the seal stability and reduce the occurrence of fiber tear contamination.

The high total amount of particles in the disclosed water-based hot-melt adhesive is for forming voids in the coating layer of the water-based hot-melt adhesive on the medical polyolefin spunbonded nonwoven fabric but maintains the desired seal strength provided by the adhesive layer and the adhesion to the nonwoven fabric.

The disclosed water-based hot-melt adhesive is prepared by adding wax particles, tackifier particles and water as solvent into water-base polyolefin resin, evenly mixing and dispersing to form a water-based hot-melt adhesive. The water-based hot-melt adhesive can be a coating solution for subsequently coating step. The coating solution is coated on a substrate and dried at elevated temperature to evaporate the solvent for forming a water-based hot-melt adhesive coating layer. The obtained water-based hot-melt adhesive coating layer can be heated to from 90° C. to 150° C. to conduct a heal sealing step. The preparation process of the water-based hot-melt adhesive of the present invention do not need the blending step required in the conventional hot-melt adhesive preparation method but provide sufficient seal strength and gas-permeability for the healthcare packaging after application.

In a preferred embodiment of the present invention, the water-based hot-melt adhesive preferably comprises 100 weight parts of water-base polyolefin resin, 45 weight parts to 80 weight parts of wax particles, and 30 weight parts to 80 weight parts of tackifier particles, wherein the total amount of the wax particles and the tackifier particles is from 48 wt % to 57 wt % of the total weight of the water-based hot-melt adhesive. If the total amount of particles is too less, the gas-permeability of the coating layer is insufficient, if the total amount of the particle is too high, the seal strength of the coating layer will decrease.

The disclosed water-based hot-melt adhesive uses water-base polyolefin resin as hot-melt adhesive base, the adhesion of the water-based hot-melt adhesive coating layer formed thereby to a polyolefin spunbonded nonwoven fabric substrate is high. Because the polyolefin resin is low polarity material, as the water-based hot-melt adhesive coated nonwoven fabric is heat sealed with a flexible packaging material, such as polyethylene substrate or polypropylene substrate, the difference of the surface polarity of the fabric and the packaging material is small, the adhesion of the seal interface is high to provide a heat seal stability and reduce the fiber tear when peeling apart the nonwoven fabric. The water-base polyolefin resin used in the disclosed water-based hot-melt adhesive can be hydrophilic modified polyolefin resin, the glass transition temperature (Tg) of the water-base polyolefin resin is less than 0° C. and the melting point thereof is greater than 90° C. and preferably, the glass transition temperature thereof is less than −100° C. and the melting point thereof is greater than 120° C. The suitable water-base polyolefin resin can be, such as water-based polyethylene resin, water-based polypropylene resin, water-based polybutylene, water-based oxidized polyethylene resin or combinations thereof, but not limited thereto.

Suitable water-base polyolefin resin of the disclosed water-based hot-melt adhesive can be commercial products, such as, for example, ALTRIX WPE-09838 from Kelly Chemicals Co., Taiwan; Chemipearl™ S300, S500 from Mitsui Chemicals Inc., Japan; Arrowbase SB-1030N from Unitika Ltd. Japan; HME-118-B from MICA Corp., US, but not limited thereto.

The wax particles used in the disclosed water-based hot-melt adhesive are to decrease the melt viscosity and surface tackiness of the water-based hot-melt adhesive and adjust the fluidity and wettability but not significantly to decrease the adhesion of the water-based hot-melt adhesive. In the disclosed water-based hot-melt adhesive, the wax particles is present from 40 weight parts and 85 weight parts per hundred weight parts of the water-base polyolefin resin, and preferably is from 45 weight parts to 80 weight parts Furthermore, for enhancing the gas-permeability of the disclosed water-based hot-melt adhesive coating layer on the polyolefin spunbonded nonwoven fabric substrate, the particle size (D50) of the wax particles can be in the range of from 3 μm to 20 μm and preferably is in the range of from 3 μm to 15 μm.

The wax particles suitably used in the disclosed water-based hot-melt adhesive has a glass transition temperature (Tg) less than 0° C. and a melting point from 70° C. to 180° C. The suitable wax particles can be commercially obtained, such as Fischer-Tropsch synthetic wax, polypropylene micronized wax, polyethylene micronized wax, oxidized polyethylene wax powder, microcrystalline wax or combinations thereof, but not limited thereto. The suitable Fischer-Tropsch synthetic wax can be, for example, Sasolwax Spray 30-G, Spray 30G-M, Spray 30G-EF, Spray 105, Spray 105-G, Spray 105G-EF, Sasolwax Aqua 30-G, Aqua 30G-EF commercially obtained from Sasol Ltd., South Africa. The suitable polypropylene micronized wax can be, such as, CERAFLOUR® 913 and CERAFLOUR® 914 commercially obtained from BYK-Chemie GmbH, Germany, or CERETAN® MP2120 commercially obtained from Münzing Chemie GmbH, Germany. The suitable polyethylene micronized wax can be, such as, CERAFLOUR® 925, CERAFLOUR® 929N commercially obtained from BYK-Chemie GmbH, Germany, CERETAN® MO4715 commercially obtained from Münzing Chemie GmbH, Germany, but not limited thereto.

The tackifier used in the disclosed water-based hot-melt adhesive is for decreasing the melt viscosity of the water-based hot-melt adhesive, increasing the wettability and initial adhesion to the adherent and adjusting the heat resistance temperature of the hot melt adhesive. The disclosed water-based hot-melt adhesive uses tackifier particles to achieve a high total amount of particles in order to enable the coating layer formed by the water-based hot-melt adhesive on the medical polyolefin spunbonded nonwoven fabric to provide satisfied interstices but still maintain the desired seal strength and adhesion to the non-woven fabric. The tackifier particles in the disclosed water-based hot-melt adhesive is present in an amount from 25 weight parts to 85 weight parts per hundred weight parts of the water-base polyolefin resin and preferably is in an amount from 30 weight parts to 80 weight parts.

For providing satisfied gas-permeability and seal strength to the adhesive coating layer form by the disclosed water-based hot-melt adhesive on the polyolefin spunbonded nonwoven fabric substrate, the particle size (D50) of the tackifier particles in the disclosed water-based hot-melt adhesive is similar to the particle size (D50) of the wax particles and can be from 3 μm to 35 μm and preferably from 5 μm to 30 μm. The glass transition temperature (Tg) of the tackifier particles is more than 0° C. and the melting point thereof is from 90° C. to 160° C. In the disclosed water-based hot-melt adhesive, the amount of the tackifier particles can be adjusted according to the amount of wax particles to make up the total amount of particles, that is the total amount of the tackifier particles and the wax particles, to be 45 wt % to 60 wt % of the water-based hot-melt adhesive, and preferably to be 48 wt % to 57 wt %. The weight ratio of the wax particles and the tackifier particles is from 0.6:1 to 3:1. If the amount of the wax particles is less, the adhesive coating layer cannot be even split. If the amount of the wax particles is higher, the seal strength of the adhesive coating layer is insufficient.

The tackifier particles suitably used in the disclosed water-based hot-melt adhesive can be petroleum resin micropowders or hydrogenated petroleum resin micropowders with melting point greater than 90° C., for example, C5 petroleum resin micropowders, C9 petroleum resin micropowders, C5/C9 copolymerized petroleum resin micropowders, hydrogenated C9 petroleum resin micropowders or combinations thereof, for example, the commercial products, Wingtack® 95, Wingtack® 98, Wingtack® STS, Wingtack® Extra, Cleartack® W-90, Cleartack® W-110, Cleartack® W-120 and Cleartack® W-140 sold by Cray Valley Ltd., US; the commercial products, Regalite™ R1090 and Regalite™ R1125 sold by Synthomer Co., UK; the commercial products, YL-90 and YL-120 sold by Yuen Liang Ind. & Co., Ltd., Taiwan, but not limited thereto.

In another embodiment of the present invention, the water-based hot-melt adhesive can further comprise a water-based emulsion tackifier to enhance the compatibility and coatability, except to decrease the melt viscosity of the water-based hot-melt adhesive, increase the wettability and initial adhesion to the adherent and adjust the heat resistance temperature of the hot melt adhesive. However, if the water-based hot-melt adhesive comprises excess amount of emulsion tackifier, the water-based hot-melt adhesive coating layer will penetrate into the non-woven fabric to affect the overall gas-permeability. In still another embodiment of the disclosed water-based hot-melt adhesive, the water-based emulsion tackifier can be present in an amount of 10 weight parts to 60 weight parts per hundred weight parts of the water-base polyolefin resin.

The water-based emulsion tackifier suitably used in the disclosed water-based hot-melt adhesive can be resin emulsion with glass transition temperature (Tg) higher than 0° C., such as petroleum resin emulsion, rosin ester emulsion and the derivatives there of, terpene resin and the modified resin derivatives thereof, thermoplastic phenol-formaldehyde resin emulsion, low-molecular polystyrene emulsion, vinyl acrylate copolymer emulsion and combinations thereof. Suitable petroleum resin emulsion can be, such as aliphatic hydrocarbon resin emulsion, alicyclic hydrocarbon resin emulsion, aromatic hydrocarbon resin emulsion, aliphatic/aromatic copolymer resin emulsion, for example C5 aliphatic hydrocarbon resin emulsion, C9 aromatic hydrocarbon resin emulsion and C5/C9 aliphatic/aromatic copolymer resin emulsion, hydrogenated petroleum resin emulsion. Suitable rosin ester emulsion and the derivatives thereof can be gum rosin emulsion, wood rosin emulsion, and tall oil rosin and the derivatives emulsion thereof. Suitable terpene resin and the modified resin derivatives can be such as polyterpene resin emulsion, hydrogenated terpene resin emulsion, styrenated terpene resin emulsion, terpene-phenolic resin emulsion. In an embodiment of the present invention, the water-based emulsion tackifiers can be the combinations of the above-mentioned emulsion tackifiers. In another embodiment of the present invention, the water-based hot-melt adhesive can use one or one more water-based emulsion tackifiers.

The water-based emulsion tackifier suitably used in the present invention can be commercially obtained, such as, rosin ester emulsion Dermulsene® RE802, aqueous rosin acid emulsion Dermulsene® RA702, terpene phenolic resin dispersion Dermulsene® TR602 and C5 resin emulsion Dermulsene® DP1124 obtained from DRT (Les Dérivés Résiniques et Terpénique), France; water-based rosin ester emulsion SUPER ESTER E720W obtained from Arakawa Chemical, Japan; ethylene acrylic acid copolymer dispersion Michem® Prime 4983R, Michem® Prime 4990R, Michem® Prime 4983-40R obtained from commercially obtained from Michelman, Inc. US; an ethylene-acrylic acid copolymer wax emulsion Aquacer 1061 commercially obtained from BYK-Chemie GmbH, Germany; rosin ester emulsion Addtack™ 880L, commercially obtained from West Tech Chemical Co., Ltd, China, but not limited thereto.

The disclosed water-based hot-melt adhesive can further comprise additives, such as wetting dispersing agent, defoaming agent, and thickeners to enhance the coating processability of the water-based hot-melt adhesive; antioxidants, UV stabilizers, antibacterial agents, antistatic agents to increase the functionality of water-based hot melt adhesives. The types and amounts of the additives can be properly selected by person skilled in the related art in accordance with the practical requirements of the hot-melt sealing film.

In another aspect, the present invention is to provide a water-based hot-melt adhesive coated nonwoven fabric which comprises a polyolefin spunbonded nonwoven fabric and a water-based hot-melt adhesive described above coated on at least one surface of the polyolefin spunbonded nonwoven fabric. The gas-permeability of the disclosed water-based hot-melt adhesive coated nonwoven fabric is less than 180 seconds (TAPPI (Technical Association of the Pulp and Paper industry) T-460), and the seal strength is more than 220 g/15 mm (ASTM (American Society for Testing and Materials) F-88).

As used herein, the "seal strength" refers to the peel strength required to separate two sealed flexible sheet material, the strength is measured according to ASTM F88 in a "T-peel" configuration at an elongation speed of 200 mm/min.

As used herein, the gas "permeability" refers to the air resistance of gas passing through a gas-permeable sheet material. According to the TAPPI T-460, it measures the time required for 100 cubic centimeters of air passing through a 1 inch square of sample at a pressure difference of approximately 1.22 kPa.

The suitable polyolefin spunbonded nonwoven fabric for the disclosed gas-permeable hot-melt sealing film can be the nonwoven fabric commonly used in the healthcare packaging, DuPont Tyvek® with a density of 40 g/m$^2$ to 80 g/m$^2$, such as Tyvek® 1073B, Tyvek® 1059B, Tyvek® 2FS and the like, but not limited thereto.

In the disclosed water-based hot-melt adhesive coated nonwoven fabric, the water-based hot-melt adhesive can be coated evenly over all the surface of the polyolefin spunbonded nonwoven fabric or partially at specific area thereof, and the coating amount is in the range of from 10 g/m$^2$ to 20 g/m$^2$, and preferably is in the range of from 12 g/m$^2$ to 18 g/m$^2$.

The packaging materials suitably sealed with the disclosed water-based hot-melt adhesive coated nonwoven fabric can be films or the blister containers made from, for example, PET (polyethylene terephthalate), PETG (Polyethylene terephthalate glycol), PVC (polyvinyl chloride), APET (amorphous polyethylene terephthalate), PS (polystyrene), PP (polypropylene), PC (polycarbonate), PE (polyethylene), nylon, but not limited thereto.

The disclosed water-based hot-melt adhesive coated nonwoven fabric can be heat sealed with a packaging material as described above at the temperature of from 90° C. to 150° C. The seal strength of the sealed packaging is more than 220 g/15 mm and preferably, is more than 250 g/15 mm.

The prepare method of the disclosed water-based hot-melt adhesive coated nonwoven fabric comprises adding wax particles, tackifier particles and water as solvent into the water-base polyolefin resin, mixing and stirring evenly to form a water-based hot-melt adhesive emulsion. The prepared water-based hot-melt adhesive emulsion is coated on a polyolefin spunbonded nonwoven fabric substrate and dried at the temperature of from 60° C. to 100° C. to evaporate the solvent to form a water-based hot-melt adhesive coated nonwoven fabric. The water-based hot-melt adhesive can be coated by the coating processes commonly used in this technical field, for example, roll coating process, blade coating process, roller coating process, spin coating process, spray coating process, slot-die coating process, or air knife coating process, but not limited to this.

The disclosed water-based hot-melt adhesive coated nonwoven fabric can be heat sealed with flexible sheets or blister containers at the peripheral edges to prepare a healthcare device packaging with sufficient gas-permeability for steam sterilization or ethylene oxide (EO) sterilization and providing sufficient reliable seal strength and peelability. When peeling apart the heat sealing area to open the healthcare packaging, the water-based hot-melt adhesive layer is cleanly split to reduce the fiber tear occurred at the non-woven fabric, which may cause contamination to the healthcare devices.

The present invention will be explained in further detail with reference to the examples. However, the present invention is not limited to these examples.

EXAMPLE

The materials used in the Example were as below:

WPE-09838: polyethylene emulsion, melting point 145° C., glass transition temperature (Tg): −120° C., solid content: 25%, solvent: water, commercially obtained from Kelly Chemicals Co., Taiwan.

Arrowbase SB-1030N: polyethylene emulsion, melting point: 145° C., glass transition temperature (Tg): −120° C., solid content: 26%, solvent: water, commercially obtained from Unitika Ltd, Japan.

DL 326PA: styrene butadiene latex, melting point 230.9° C., glass transition temperature (Tg) −42.1° C., solid content: 50%, solvent: water, commercially obtained from Trinseo LLC, US.

VINNAPAS® EAF-68: ethylene-vinyl acetate-acrylate copolymer dispersion, melting point: 240° C., glass transition temperature (Tg): −35° C., solid content: 59.5%, solvent: water, commercially obtained from Wacker Chemie AG, Germany.

Michem® Prime 4983-40R: ethylene acrylic acid copolymer dispersion, melting point: 140° C., glass transition temperature (Tg): 6.2° C., solid content: 40%, solvent: water, commercially obtained from Michelman, Inc. US.

Addtack™ 880 L: rosin ester emulsion, softening point from 75° C. to 85° C., glass transition temperature (Tg): 33.4° C., solid content: 55%, solvent: water, commercially obtained from West Tech Chemical Co., Ltd, China.

Dermulsene® RE802: rosin glyceride emulsion, softening point: 70° C., glass transition temperature (Tg): 17.9° C., solid content: 52%, solvent: water, commercially obtained from DRT, France.

Sasolwax Spray 30G-M: Fischer-Tropsch fine micronized wax powder, melting point: from 96° C. to 100° C., glass transition temperature (Tg): about −120° C., average particle size: from 9 μm to 11 μm, commercially obtained from Sasol Limited, South Africa.

CERETAN® MO4715: oxidized polyethylene wax particles, melting point: from 108 to 116° C., glass transition temperature (Tg): about −120° C., average particle size: 6 μm, commercially obtained from Münzing Chemie GmbH, Germany.

Cleartack® W-140: C9 petroleum resin micropowders, soft point: 140° C., glass transition temperature (Tg): 90° C., number-average molecular weight (Mn): 1200 g/mol, average particle size: from 5 μm to 10 μm, commercially obtained from Cray Valley Ltd, US.

Cleartack® W-140 (L): C9 petroleum resin micropowders, softening point: 140° C., glass transition temperature (Tg): 90° C., number-average molecular weight (Mn): 1200 g/mol, average particle size: from 10 μm to 30 μm, commercially obtained from Cray Valley Ltd, US.

Cleartack® W-120: C9 petroleum resin micropowders, softening point: 120° C., glass transition temperature (Tg): 70° C., number-average molecular weight (Mn): 950 g/mol, average particle size: from 10 μm to 20 μm, commercially obtained from Cray Valley Ltd, US.

YL-90: C9 petroleum resin, softening point: 100° C., glass transition temperature (Tg): 50° C., number-average molecular weight (Mn): 750 g/mol, average particle size: from 30 μm to 40 μm, commercially obtained from Yuen Liang Ind. & Co., Ltd., Taiwan.

BYK-3450: polyether-modified siloxane-based surfactant, commercially obtained from BYK-Chemie GmbH, Germany.

TEGO® Wet 240: siloxane-based wetting dispersing additive, commercially obtained from Evonik Industries GmbH, Germany.

Rheovis® AS 1125: acrylic thickener, solid content: 25%, solvent: water, commercially obtained from BASF SE, Germany.

BYK-025: silicone-based defoamer, solid content: 18.5%, solvent: dipropylene glycol monomethyl ether, commercially obtained from BYK-Chemie GmbH, Germany.

Tyvek® 2FS: high density polyethylene spunbonded nonwoven fabric substrate, commercially obtained from DuPont de Nemours, Inc., US.

Example 1

27.36 weight parts of polyethylene emulsion (WPE-09838), 3.76 weight parts of oxidized polyethylene wax particles (Ceretan® MO4715), 3.76 weight parts of C9 petroleum resin micropowders (Cleartack® W-140 (L)), 0.06 weight parts of surfactant (BYK-3450), 1.06 weight parts of thickener (AS-1125), 0.04 weight parts of defoamer (BYK-025) and 37.4 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 14.6 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 2

29.76 weight parts of polyethylene emulsion (WPE-09838), 5.04 weight parts of Fischer-Tropsch synthetic wax particles (Sasolwax Spray 30G-M), 2.48 weight parts of C9 petroleum resin micropowders (Cleartack® W-140), 0.06 weight parts of surfactant (BYK-3450), 0.96 weight parts of thickener (AS-1125), 0.04 weight parts of defoamer (BYK-025) and 22.9 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried for 2 minutes at 80° C. to form a 15.1 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 3

23.81 weight parts of polyethylene emulsion (WPE-09838), 2.7 weight parts of rosin ester emulsion (Addtack™ 880 L), 3.76 weight parts of polypropylene wax particles (Ceretan® MP 2120), 3.76 weight parts of C9 petroleum resin micropowders (Cleartack® W-140), 0.06 weight parts of surfactant (BYK-3450), 1.06 weight parts of thickener (AS-1125), 0.04 weight parts of defoamer (BYK-025) and 32.6 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 17.1 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 4

26.78 weight parts of polyethylene emulsion (WPE-09838), 1.35 weight parts of rosin ester emulsion (Addtack™ 880 L), 3.76 weight parts of Fischer-Tropsch synthetic wax particles (Sasolwax Spray 30G-M), 3.76 weight parts of C9 petroleum resin micropowders (Cleartack® W-140), 0.06 weight parts of surfactant (BYK-3450), 1.06 weight parts of thickener (AS-1125), 0.04 weight parts of defoamer (BYK-025) and 31.0 weight parts of deionized water, were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 14.0 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 5

22.32 weight parts of polyethylene emulsion (WPE-09838), 1.35 weight parts of rosin ester emulsion (Addtack™ 880 L), 2.79 weight parts of ethylene acrylic acid copolymer dispersion (Michem® Prime 4983-40R), 3.76 weight parts of Fischer-Tropsch synthetic wax particles (Sasolwax Spray 30G-M), 3.76 weight parts of C9 petroleum resin micropowders (Cleartack® W-140), 0.06 weight parts of surfactant (BYK-3450), 1.06 weight parts of thickener (AS-1125), 0.04 weight parts of defoamer (BYK-025) and 32.7 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 15.5 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 6

19.34 weight parts of polyethylene emulsion (WPE-09838), 2.7 weight parts of rosin ester emulsion (Addtack™ 880 L), 2.79 weight parts of ethylene acrylic acid copolymer dispersion (Michem® Prime 4983-40R), 3.76 weight parts of Fischer-Tropsch synthetic wax particles (Sasolwax Spray 30G-M), 3.76 weight parts of C9 petroleum resin micropowders (Cleartack® W-140), 0.06 weight parts of surfactant (BYK-3450), 0.96 weight parts of thickener (AS-1125), 0.04 weight parts of defoamer (BYK-025) and 27.6 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 15.9 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Example 7

29.84 weight parts of polyethylene emulsion (SB-1030N), 3.76 weight parts of Fischer-Tropsch synthetic wax particles (Sasolwax Spray 30G-M), 3.76 weight parts of C9 petroleum resin micropowders (Cleartack® W-140), 0.12 weight parts of surfactant (BYK-3450), 2.86 weight parts of thickener (AS-1125), 0.08 weight parts of defoamer (BYK-025) and 87.8 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 15.3 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Comparative Example 1

13.1 weight parts of ethylene acrylic acid copolymer dispersion (Michem® Prime 4983-40R), 1.5 weight parts of rosin glyceride emulsion (Dermulsene® RE 802), 3.75 weight parts of Fischer-Tropsch synthetic wax particles (Sasolwax Spray 30G-M), 1.875 weight parts of C9 petroleum resin micropowders (Cleartack® W-120), 1.875 weight parts of C9 petroleum resin micropowders (YL-90), 0.04 weight parts of surfactant (BYK-3450), 0.04 weight parts of defoamer (BYK-025) and 45.6 weight parts of deionized water were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form a 13.9 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Comparative Example 2

7.68 weight parts of styrene butadiene latex (DL 326PA), 7.2 weight parts of ethylene acrylic acid copolymer dispersion (Michem® Prime 4983-40R), 1.6 weight parts of ethylene-vinyl acetate-acrylate copolymer dispersion (VINNAPAS® EAF 68), 7.52 weight parts of C9 petroleum resin micropowders (Cleartack® W-140), 0.06 weight parts of wetting additive (TEGO® Wet 240), 0.04 weight parts of defoamer (BYK-025) and 41.6 weight parts of deionized water, were mixed and stirred for 1 hour for evenly dispersion to prepare a water-based hot-melt adhesive solution.

The obtained water-based hot-melt adhesive solution was coated on a high-density polyethylene spunbonded nonwoven fabric substrate (Tyvek® 2FS) and dried at 80° C. for 2 minutes to form 10.0 g/m$^2$ water-based hot-melt adhesive coating layer on the high-density polyethylene spunbonded nonwoven fabric substrate to prepare a water-based hot-melt adhesive coated nonwoven fabric.

The gas-permeability, heat seal strength and layer-peeling of the obtained water-based hot-melt adhesive coated nonwoven fabric were evaluated by the evaluation methods described hereinafter. The results were shown in Table 1.

Evaluation methods of the coating amount, gas-permeability, heat seal strength, layer-peeling are as below:

Coating amount: according to EN ISO 536 standard test, samples were obtained by the Sample Cutter 240/100 manufactured by Hans Schmidt & Co GmbH, Germany. The samples from the water-based hot-melt adhesive coated nonwoven fabric and the uncoated high-density polyethylene spunbonded nonwoven fabric substrate were weighted, respectively. The difference from the weights of the water-based hot-melt adhesive coated nonwoven fabric and the uncoated high-density polyethylene spunbonded nonwoven fabric substrate was the mass of coating amount per unit of area (g/m$^2$ (gsm)).

Gas-permeability: measure the average time required for 100 cubic centimeters of air to pass through the gas-permeable hot-melt sealing film according to the TAPPI T-460 standard by Gurley type Densometer Model 4980-D, manufactured by Lesson Industrial Co., Ltd, Taiwan.

Seal strength: laminate HDPE film, Teflon fabric and the obtained water-based hot-melt adhesive coated nonwoven fabric was heat press by Heat-sealing Machine (BS-25 manufactured by Dah Bah Machinery Ind. Inc. Taiwan). The temperature of the top plate is set at 123° C., the temperature of the bottom plate is set at room temperature, the pressure of heat press is 1.5 Kg and the time is 1.5 seconds. Cut the heat sealed laminate to 15 mm wide strip sample. The sample was measured the maximum value of the tensile force as the seal strength according to the description of ASTM-88 by Tensile Strength Tester (AI-3000 manufactured by Gotech Testing Machines Inc. Taiwan).

Layer-peeling evaluation: the HDPE film was peeled away from the water-based hot-melt adhesive coated nonwoven fabric by hand and observed if any fiber tear is occurred on the high-density polyethylene spunbonded nonwoven fabric substrate. If no fiber tear is observed on the substrate, the evaluation is ○, and if fiber tear is observed, the evaluation is x.

TABLE 1

The gas-permeability, heat seal strength and layer-peeling of the water-based hot-melt adhesive coated nonwoven fabric obtained from Examples and Comparative Examples

| Example/ Comparative Example | Weight of coating layer (gsm) | Gas-permeability (s) | seal strength (gf/15 mm) | Layer-peeling |
|---|---|---|---|---|
| Example 1 | 14.6 | 163 | 409 | ○ |
| Example 2 | 15.1 | 122 | 254 | ○ |
| Example 3 | 17.1 | 128 | 318 | ○ |
| Example 4 | 14.0 | 65 | 302 | ○ |
| Example 5 | 15.5 | 64 | 270 | ○ |
| Example 6 | 15.9 | 58 | 291 | ○ |
| Example 7 | 15.3 | 110 | 417 | ○ |
| Comparative Example 1 | 13.9 | 51 | 235 | ○ |
| Comparative Example 2 | 10.0 | 60 | 158 | x |

From Table 1, the water-based hot-melt adhesive coated nonwoven fabric prepared by Examples 1 to 7 provided satisfied gas-permeability and seal strength after heat sealing with HDPE film. When the HDPE film was peeling away, no fiber tear was occurred on the high-density polyethylene spunbonded nonwoven fabric substrate.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A water-based hot-melt adhesive, comprising: 100 weight parts of water-base polyolefin resin, 40 weight parts to 85 weight parts of wax particles, and 25 weight parts to 85 weight parts of tackifier particles, wherein a total amount of the wax particles and the tackifier particles is from 45 wt % to 60 wt % of a total weight of the water-based hot-melt adhesive.

2. The water-based hot-melt adhesive as claimed in claim 1, wherein a particle size of each of the wax particles is from 3 μm to 20 μm.

3. The water-based hot-melt adhesive as claimed in claim 1, wherein a particle size of each of the tackifier particles is from 3 μm to 35 μm.

4. The water-based hot-melt adhesive as claimed in claim 1, wherein a weight ratio of the wax particles and the tackifier particles is from 0.6:1 to 3:1.

5. The water-based hot-melt adhesive as claimed in claim 1, wherein the water-based hot-melt adhesive comprises: 100 weight parts of the water-base polyolefin resin, 45 weight parts to 80 weight parts of the wax particles, and 30 weight parts to 80 weight parts of the tackifier particles, wherein the total amount of the wax particles and the tackifier particles is from 48 wt % to 57 wt % of the total weight of the water-based hot-melt adhesive.

6. The water-based hot-melt adhesive as claimed in claim 1, further comprising water-based emulsion tackifier.

7. The water-based hot-melt adhesive as claimed in claim 6, wherein the water-based emulsion tackifier is present in amount of from 10 weight parts to 60 weight parts.

8. The water-based hot-melt adhesive as claimed in claim 1, wherein a glass transition temperature of the water-base polyolefin resin is less than 0° C. and a melting point of the water-base polyolefin resin is greater than 90° C., a glass transition temperature of the wax particles is less than 0° C. and a melting point of the wax particles is from 70° C. to 180° C., a glass transition temperature of the tackifier particles is greater than 0° C. and a melting point of the tackifier particles is from 90° C. to 160° C.

9. The water-based hot-melt adhesive as claimed in claim 1, wherein a glass transition temperature of the water-based hot-melt adhesive is from −120° C. to −50° C.

10. The water-based hot-melt adhesive as claimed in claim 1, wherein the water-base polyolefin resin is selected from the group consisting of water-based polyethylene resin, water-based polypropylene resin, water-based polybutylene resin, water-based oxidized polyethylene resin and combinations thereof.

11. The water-based hot-melt adhesive as claimed in claim 1, wherein the wax particles is selected from the group consisting of Fischer-Tropsch synthetic wax particles, polypropylene wax particles, polyethylene wax particles, oxidized polyethylene wax particles, microcrystalline wax and combinations thereof.

12. The water-based hot-melt adhesive as claimed in claim 1, wherein the tackifier particles is selected from the group consisting of C5 petroleum resin micropowders, C9 petroleum resin micropowders, C5/C9 copolymerized petroleum resin micropowders, hydrogenated C9 petroleum resin micropowders and combinations thereof.

13. The water-based hot-melt adhesive as claimed in claim 6, wherein the water-based emulsion tackifier is selected from the group consisting of petroleum resin emulsion, rosin ester emulsion and derivatives thereof, terpene resin and modified resin derivatives thereof, thermoplastic phenol-formaldehyde resin emulsion, low-molecular polystyrene emulsion, vinyl acrylate copolymer emulsion and combinations thereof.

14. A water-based hot-melt adhesive coated nonwoven fabric, comprising: a polyolefin spunbonded nonwoven fabric substrate and a water-based hot-melt adhesive coating formed on at least one side of the polyolefin spunbonded nonwoven fabric, wherein a water-based hot-melt adhesive for forming the water-based hot-melt adhesive coating comprises: 100 weight parts of water-base polyolefin resin, 40 weight parts to 85 weight parts of wax particles, and 25 weight parts to 85 weight parts of tackifier particles, wherein a total amount of the wax particles and the tackifier particles is from 45 wt % to 60 wt % of a total weight of the water-based hot-melt adhesive.

15. The water-based hot-melt adhesive coated nonwoven fabric as claimed in claim 14, wherein a gas-permeability of the water-based hot-melt adhesive coated nonwoven fabric is less than 180 seconds and a seal strength thereof is more than 220 g/15 mm.

16. The water-based hot-melt adhesive coated nonwoven fabric as claimed in claim 14, wherein a coating amount of the water-based hot-melt adhesive on the polyolefin spunbonded nonwoven fabric substrate is from 10 $g/m^2$ to 20 $g/m^2$.

* * * * *